(12) United States Patent
Ala-Vannesluoma (10) Patent No.: US 7,609,715 B2
(45) Date of Patent: Oct. 27, 2009

(54) NON-TRANSPARENT DATA TRANSMISSION IN A MOBILE NETWORK

(75) Inventor: Jukka Ala-Vannesluoma, Tampere (FI)

(73) Assignee: Nokia Corporation, Espoo (FI)

( * ) Notice: Subject to any disclaimer, the term of this patent is extended or adjusted under 35 U.S.C. 154(b) by 1422 days.

(21) Appl. No.: 10/225,434

(22) Filed: Aug. 21, 2002

(65) Prior Publication Data

US 2003/0039269 A1 Feb. 27, 2003

(30) Foreign Application Priority Data

Aug. 23, 2001 (FI) .................................. 20011699

(51) Int. Cl.
*H04J 3/22* (2006.01)
(52) U.S. Cl. ..................... 370/466; 370/394; 370/395.1
(58) Field of Classification Search .................. 370/394, 370/395.1, 466
See application file for complete search history.

(56) References Cited

U.S. PATENT DOCUMENTS

| | | | |
|---|---|---|---|
| 5,920,545 A | 7/1999 | Räsänen | |
| 6,118,834 A | 9/2000 | Räsänen | |
| 6,286,076 B1 * | 9/2001 | Schultz | 711/101 |
| 6,594,486 B1 | 7/2003 | Rasanen | |
| 6,611,871 B1 * | 8/2003 | Kada et al. | 709/238 |
| 6,985,470 B1 | 1/2006 | Rasanen | |

| | | | |
|---|---|---|---|
| 2002/0001287 A1 | 1/2002 | Bergenwall et al. | |
| 2002/0176446 A1 * | 11/2002 | Rasanen | 370/503 |

FOREIGN PATENT DOCUMENTS

| | | |
|---|---|---|
| JP | 2000/059373 | 2/2000 |
| WO | WO9963703 | 12/1999 |
| WO | WO 00/74344 A1 | 12/2000 |
| WO | WO 01/28131 | 4/2001 |
| WO | WO 01/45443 | 6/2001 |
| WO | WO 01/61943 | 8/2001 |

OTHER PUBLICATIONS

Michel Mouly and Marie-Bernadette Poulet, *The GSM System for Mobile Communications*, 1992.

* cited by examiner

*Primary Examiner*—Jason E Mattis
(74) *Attorney, Agent, or Firm*—Hollingsworth & Funk, LLC (57) ABSTRACT

A method in a mobile communication system, comprising a mobile station and a base transceiver station, which are both arranged to use radio link protocol (RLP) and link protocol (L2R) in non-transparent data transmission. At least a first and a second frame of fixed lengths are defined for the radio link protocol for data transmission, the frames being of different lengths. The link protocol is arranged to transmit status information defining data transmission. In non-transparent data transmission between the mobile station and the base transceiver station, remapping during the data transmission between said frames is arranged to be initiated. The initiation of the remapping is arranged to be indicated to the link protocol layer (L2R). Current status information on the link protocol (L2R) is arranged to be transmitted in the radio link protocol (RLP) frame transmitted first after said remapping.

15 Claims, 3 Drawing Sheets

NON-TRANSPARENT DATA TRANSMISSION IN A MOBILE NETWORK

FIELD OF THE INVENTION

The invention relates to radio systems and particularly to non-transparent data transmission in a mobile communication system.

BACKGROUND OF THE INVENTION

Mobile communication systems refer generally to various telecommunication systems that enable personal wireless data transmission when subscribers move in the area of the system. A typical mobile communication system is a public land mobile network PLMN built on the ground surface.

In second and third generation mobile communication systems, such as in the GSM (Global System for Mobile Communication), and correspondingly in the UMTS (Universal Mobile Telecommunication System), speech and data are transmitted in a digital form. In digital mobile communication systems there is, in addition to conventional speech transmission, a plurality of other services available: short messages, telefax, data transmission, etc. The services of the mobile communication systems can be generally divided into tele services and bearer services. A bearer service is a telecommunication service which forms signal transmission between user-network interfaces. For example, modem services and different data transmission services are bearer services. In a GSM mobile network, for example, circuit-switched data services are defined which utilize different data rates up to 14.4 kbit/s. In HSCSD (High Rate Circuit Switched Data) services, several tens of kilobits per second are achieved. In tele services, the network also provides terminal services. Speech, fax and videotex services are important tele services.

Bearer services are generally divided into different groups according to some property, for instance asynchronous bearer services and synchronous bearer services. Each of these groups includes a number of bearer services, such as a transparent service (T) and non-transparent service (NT). In a transparent service, the data to be transmitted is unstructured and the transmission errors are corrected only with channel coding. In non-transparent services, the data to be transmitted is structured into data packets, i.e. protocol data units (PDU) and the transmission errors are corrected using automatic retransmission protocols (in addition to channel coding). The GSM system, for instance, utilizes two protocols for non-transparent data transmission, i.e. the radio link protocol (RLP) and the link protocol L2R (Layer 2 Relay). Such link protocols are also generally known as link access control LAC.

The L2R layer positions the data to be sent in L2R frames, which are transferred to the RLP layer to be transmitted further. In the GSM system, the RLP layer supports several data rates, i.e. in practice, several different channel codings. In order to implement different data rates, the RLP layer has two RLP frame lengths available, to which the data to be transmitted is positioned: one of 240 bits and the other of 576 bits. The RLP frame length used in the data transmission connection must be able to be changed to another frame length during the data transmission, if required, whereby both the transmitter RLP and the receiver RLP must be resynchronised, i.e. the data must be remapped. This takes place typically in such a way that the receiver RLP gives information on the RLP frame number expected to be received next, as a response to which the transmitter RLP unpacks the user data sent after said RLP frame from the transmission buffer and positions it to new RLP frames of another length. Data transmission can naturally take place in both directions, i.e. from the mobile station to the network and from the network to the mobile station. Thus, information is given from the receiver RLP of both the mobile station and the network to the transmitter RLP of the opposite side on the RLP frame number expected to be received next.

Three different versions are defined for the RLP protocol: versions 0, 1 and 2. The GSM system utilizes all three versions, whereas the UMTS system utilizes version 2 only. The data packets given by the L2R layer to the RLP layer to be transmitted can comprise user data, filler data and status information comprising information defining the status of the data transmission. The length of the data packet given to the RLP layer by the L2R layer depends on the channel coding used in each particular case. When version 0 or 1 of the RLP protocol is used, the status information must be sent in every data packet of the L2R layer, but in the RLP version 2 the status information is sent only when the status of the data transmission is changed in some way.

A problem in the above-described system is the situation where, when using RLP version 2, a remapping request arrives from the network almost immediately after the status update has been sent from the terminal, requesting the RLP frames sent before the status updating to be retransmitted. Thus, a situation arises where the terminal has already sent the status information, but even after that, the terminal requests for retransmission of RLP frames that contain the status information. In such a case, there may be a significant delay in the updating of the status information on the network side, particularly if there is a lot of information to be retransmitted and the status information is sent substantially in the last frames. Thus, if the status updating concerns data carrier detect (DCD) that is transmitted with a long delay, for example, the data transmission may be completely terminated.

BRIEF DESCRIPTION OF THE INVENTION

An object of the invention is to provide an arrangement by means of which the terminal and the network have the same, updated information on the status of the terminal. The objects of the invention are achieved with a method, mobile communication system and an apparatus of a mobile communication system, such as a mobile station or a base transceiver station, which are characterized in what is stated in the independent claims.

The preferred embodiments of the invention are disclosed in the dependent claims.

The invention is based on the idea that the status information on the L2R layer is transmitted every time the length of the RLP frame changes as a result of a change of channel coding. Thus, the status information on the L2R layer is preferably transmitted every time the RLP frame length changes, irrespective of when the status has last changed.

In connection with the change of channel coding, the terminal and the network initiate remapping of the RLP frames to be transmitted, in other words what is called a Remap process. Hereby, the terminal and the network start to retransmit the data contained in those RLP frames that have been sent after the RLP frame that the opposite side has informed as last received. Thus, the RLP frames sent after the RLP frame that the opposite side has informed as last received are copied from the transmission memory to the L2R layer, which unpacks the data of the frames into a remap buffer, the data in the buffer being arranged in user data fields of RLP frames of different lengths, whereby the status information on the L2R layer is preferably connected to the first RLP frame to be sent to the network, irrespective of when the status has last changed.

In accordance with a preferred embodiment of the invention, the L2R layer is arranged to interpret the first RLP frame transmitted from the RLP transmission memory to the L2R layer in such a way that the remap process has been initiated. Correspondingly, this indicates to the L2R layer that the L2R status information is to be attached to the first RLP frame of a different length after the remap process.

An advantage of the method and system of the invention is that both the terminal and the network always receive updated information on each other's L2R status, which improves the efficiency of the data transmission and the protocol structure. Further, it can preferably be confirmed that there will be no such problematic situation where the opposite side would have outdated L2R information. An advantage of one embodiment of the invention is that it can be confirmed that every time RLP frames are gathered to the remap buffer in connection with the remap process, the first RLP frame of a new length that is sent to the opposite side contains the L2R status information.

BRIEF DESCRIPTION OF THE FIGURES

The invention will now be described in more detail in connection with preferred embodiments, with reference to the attached drawings, of which

DETAILED DESCRIPTION OF THE INVENTION

In the following, the invention will be described in more detail using non-transparent data transmission implemented in the GSM system as an example. The invention is not, however, confined to the GSM system but can be applied to any mobile communication system in which non-transparent data transmission service of a corresponding type is implemented. In particular, the invention can be implemented in the third generation (3G) UMTS mobile communication system when using what are called dual-mode mobile stations that function in both the GSM and the UMTS network.

Figure 1:
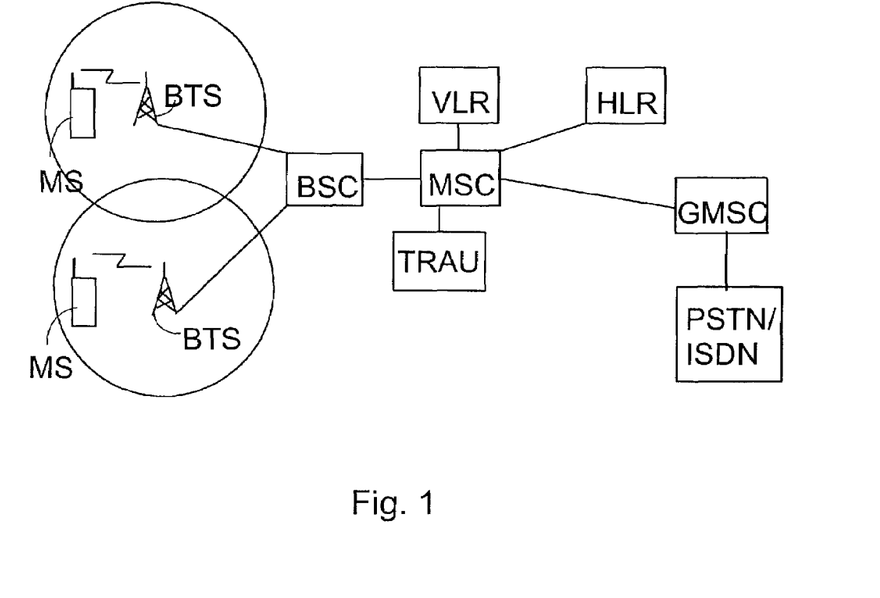
FIG. 1 shows a block diagram of the structure of the GSM system.

FIG. 1 illustrates the structure of the GSM system. The GSM system comprises mobile stations (MS) that are in connection with base transceiver stations (BTS) via a radio path. Several base transceiver stations BTS are connected to a base station controller (BSC), which controls the radio frequencies and channels available for the base transceiver stations. The base station controller BSC and the base transceiver stations BTS connected thereto form a base station sub-system (BSS). The base station controllers are, in turn, in connection with a mobile services switching centre (MSC), which attends to the connection set-up and routing of calls to the correct addresses. Here, two databases are used as an aid, the databases comprising information on mobile station subscribers: a home location register (HLR) comprising information on all subscribers to the mobile network and on the services subscribed by them, and a visitor location register (VLR) comprising information on mobile stations visiting a particular mobile services switching centre MSC. In connection with the mobile services switching centre MSC, there is typically a TRAU unit (Transcoder/Rate Adaptation Unit), i.e. an interworking function IWF, which unpacks the data positioned in the TRAU frames and converts the data transmission rate and the frame structure into such a form that the data can be transmitted further. The mobile services switching centre MSC, in turn, is connected to other mobile services switching centres via a gateway mobile services switching centre GMSC and to a public switched telephone network (PSTN). The GSM system is described in more detail in the ETSI/GSM specifications and in the book *The GSM System for Mobile Communications* by M. Mouly and M. Pautet, Palaiseau, France, 1992, ISBN: 2-957190-07-7.

When a non-transparent GSM data connection is set up with a mobile station MS, the data to be transmitted is positioned in RLP frames (Radio Link Protocol). The RLP is a frame-structured, balanced (HDLC type) data transmission protocol, in which error correction is based on retransmission of corrupted frames at the request of the receiving party. Since the responsibility for the correctness of the data to be transmitted is directed at one protocol layer, heavy signalling between different elements of the data transmission chain is avoided. In the GSM system, the data transmission arranged in the RLP frames takes place between a mobile station MS and/or a terminal adaptation function TAF in a data terminal connected to it and, typically, an interworking function in a mobile services switching centre MSC.

Figure 2:
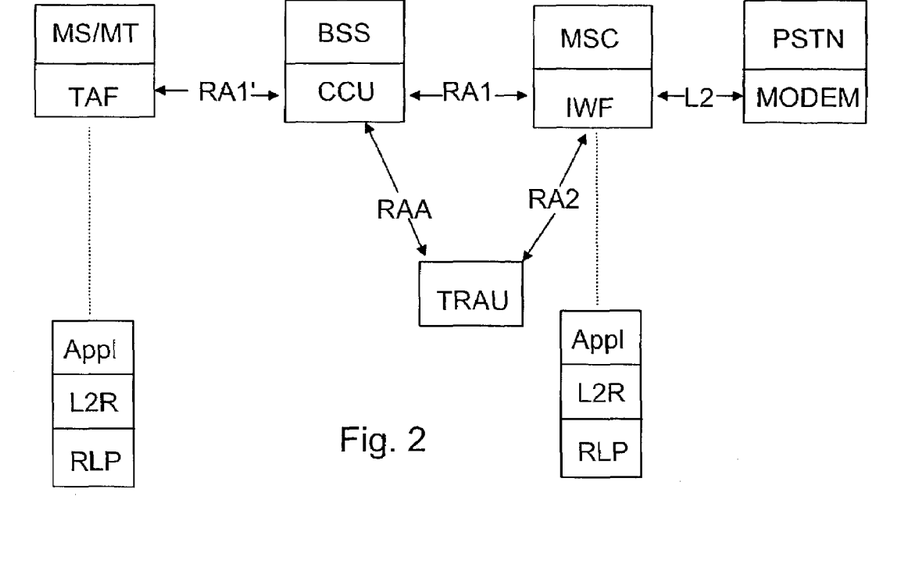
FIG. 2 shows protocols and adaptations required for non-transparent bearer services.

FIG. 2 illustrates some protocols and functions required for non-transparent bearer services. A non-transparent, circuit-switched connection between the terminal adapter TAF and interworking function IWF on the GSM traffic channel comprise several protocol layers, which are common to all these services. These include different rate adaptation functions RA, such as RA1' between the terminal adapter TAF and a CCU (Channel Codec Unit) positioned in the base station subsystem BSS, RA1 between the CCU and interworking function IWF, RAA (or RAA' to the channel of 14.4 kbit/s) between the CCU and the transcoder unit TRAU positioned separately from the base transceiver station, and RA2 between the transcoder unit TRAU and the interworking function IWF. The IWF and the TAF further comprise protocols of upper layers, which are service-specific. In an asynchronous non-transparent bearer service, the IWF and the TAF must comprise the L2R (Layer 2 Relay) and RLP (Radio Link Protocol) protocols, in addition to which the IWF needs a modem or rate adapter in the direction of the fixed network. The interface between the IWF and, for instance, an audio modem MODEM is in accordance with CCITT V.24, and it is denoted by symbol L2 in FIG. 2. This non-transparent configuration is also used in the access to the Internet.

The L2R layer positions the data to be transmitted, arriving from the application, in the L2R frames, which are transferred to the RLP layer to be transmitted further. In the GSM system, the RLP layer supports several data rates, i.e. in practice, several different channel codings. In order to implement different data rates, the RLP layer has available two RLP frames of different lengths, in which the data to be transmitted is positioned: one of 240 bits and the other of 576 bits. If required, the RLP frame used in the data transmission connection must be able to be changed to a frame of another length during the data transmission, whereby both the transmitter RLP and the receiver RLP must be resynchronized.

Three different versions are defined for the RLP protocol: versions 0, 1 and 2. The GSM system utilizes all three versions, whereas the UMTS system utilizes version 2 only. The data packets given by the L2R layer to the RLP layer to be transmitted can comprise user data, filler data and status information comprising information defining the status of the data transmission. The length of the data packet given to the RLP layer by the L2R layer depends on the channel coding used in each particular case. The status information can, for example, contain information on the terminal equipment being ready to receive and transmit data (DTR, Data Terminal Ready), the carrier wave of the data transmission being detected or the data transmission connection existing (DCD, Data Carrier Detect), or flow control information, by means of which the data transmission of the opposite side is controlled, for example in a situation where the receiver buffer is becoming full.

The mobile station MS and/or the data terminal equipment MT connected thereto use a data application which forms user data UD, to which a PPP (Point-to-Point Protocol) header defining the data connection and above-described L2R-specific data are added. The data formed in such a way is further arranged in RLP frames, the length of which can be, as mentioned, 240 or 576 bits. The RLP frames of 240 bits comprise a 16-bit header, a 200-bit user data field and a 24-bit frame check sequence FCS to detect the errors on the transmission path. Such a 240-bit RLP frame is used in versions 0 and 1, and also in version 2 if unnumbered protocol control information (U frame) is used in the frame. If, on the other hand, either control information (S frame) only or control information attached to the user information (I+S frame) is transmitted in the RLP frame of version 2, the corresponding field lengths are 24+192+24 bits. Correspondingly, the headers in the 576-bit RLP frames can vary between 16 and 24 bits, whereby the length of the user data field is 536 or 528 bits. The length of the frame check sequence FCS is always 24 bits.

The data transmission rate arranged in 240-bit RLP frames is either 4.8 or 9.6 kbit/s. The 576-bit RLP frame uses 14.4 kbit/s as its transmission rate. Rate adaptation RA described above is performed for this data in such a way that the data transmission over the radio interface formed from the mobile station MS/MT to the base transceiver station BTS always takes place in accordance with the GSM specifications in one traffic channel time frame at a rate of 22.8 kbit/s.

In the HSCSD concept of the GSM system, a high-rate data signal is divided into separate data flows, which are then transferred via N sub-channels (N traffic channel frames) on the radio interface. When the data flows have been divided, they are transferred in sub-channels as if they were independent from each other, until they are combined in the IWF and the MS. However, logically these N sub-traffic channels are parts of the same HSCSD connection, i.e. they form one HSCSD traffic channel. This division and combination of the data flow is performed in the RLP according to version 2, which is thus common to all sub-channels. Below this common RLP, the same rate adaptations RA1'-RM-RA2 are performed for each sub-channel as is shown in FIG. 2 for one sub-channel, between MS/TAF and MSC/IWF. Thus, an HSCSD traffic channel uses one common RLP for different sub-channels, although on a single sub-channel, the data rate can be at least 43.2 kbit/s and the total data rate 64 kbit/s.

Thus, the data transmission rate of a traffic channel can vary at least between 4.8, 9.6, 14.4, 28.8 and 43.2 kbit/s in accordance with the number of different channel codings and HSCSD sub-channels used. This channel coding and the RLP frame used must be able to be changed to another during the data transmission. Thus, both the transmitter RLP and the receiver RLP need to be resynchronized.

In versions 0 and 1 of the RLP protocol, the status information of the L2R layer is transmitted in each RLP frame, which is not optimal what it comes to the efficiency of the data transmission. In version 2 of the L2R layer, the status information is sent in the RLP frame only when the status has changed on the L2R layer. In the data transmission according to version 2 of the RLP protocol, there may be thus a problem situation in the data transmission, when almost immediately after the status updating transmitted from the terminal, the network attempts to change the channel coding used. Thus, a situation arises where, almost immediately after the status updating transmitted from the terminal, a request for remapping arrives from the network, requesting for the RLP frames transmitted before the status updating to be retransmitted arranged into another frame length. Thus, a situation arises where the terminal has transmitted new status information, but even after that, the network requests RLP frames comprising the old status information to be retransmitted. If the status of the terminal does not change after this, and consequently, if the terminal does not transmit status information, incorrect information on the status of the terminal remains in the network, which typically causes interruptions in the data transmission before the status is re-updated. This can, in some cases, result in the termination of the data transmission.

Figure 3:
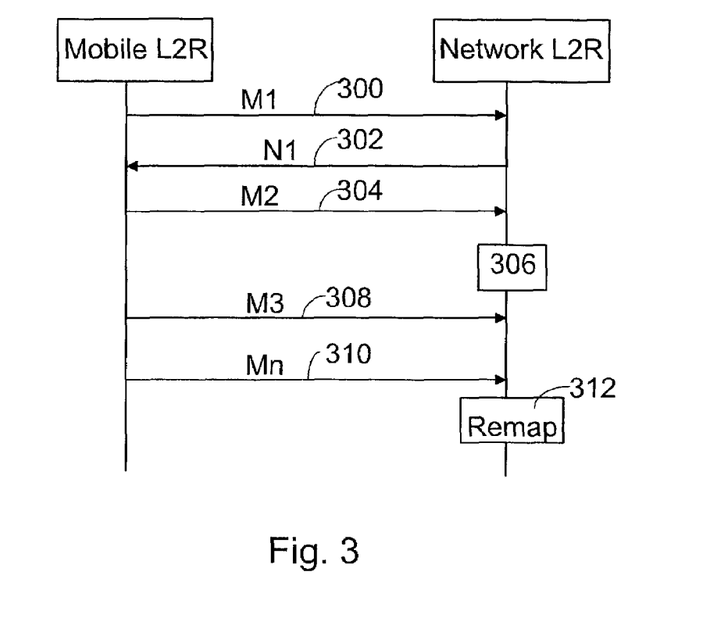
FIG. 3 shows a signalling diagram of a problematic situation according to the prior art in transmission of non-transparent data.

Such a problematic situation is illustrated in the following with reference to FIG. 3. FIG. 3 shows data transmission between the L2R layer of the terminal and the L2R layer of the base transceiver station. At first, data transmission takes place in both directions: the terminal sends data packets comprising only user data to the network (300), the sequence number of said data packets being M1; and the network sends data packets comprising only user data to the terminal (302), the sequence number of said data packets being N1. The terminal detects a need for activation of flow control of the L2R layer, typically when the receiver buffer becomes full, for instance, and transmits the data packet (304, sequence number M2), which comprises not only user data but also a status update, which expresses that the flow control must be activated. The network reacts to this and stops the transmission of data packets of the L2R layer to the terminal (306). The terminal continues the sending of user data packets (308, sequence number M3). After some time, the terminal transmits a data packet (310, sequence number Mn), which comprises not only user data but also a status update, which expresses that the L2R flow control can be deactivated. Essentially, it is exactly after this, however, that the network detects a need for remapping of channel coding (312), which results in the base transceiver station sending the terminal an RLP frame of a different length, compared with the ones used before, the frame also comprising information on the sequence number of the frame received last by the base transceiver station. After the acknowledgements, the terminal begins to retransmit those frames from the transmission buffer that the base transceiver station has not received, the data in the frames being arranged into a new frame length. The base transceiver station has typically not received the deactivation message of the flow control but receives it only in the data arranged in a new frame length, which arrives in the base transceiver station with a considerable delay. During this delay, the flow control has been reactivated from the point of view of the network, and the network is not allowed to transmit L2R data packets to the terminal, although the terminal has already attempted to deactivate the flow control considerably earlier. A corresponding problem arises in the opposite case, where the terminal attempts to transmit the activation message of the flow control, but the network receives it with a considerable delay. Thus, the problem is particularly difficult, because the terminal attempts to prevent the network from sending data packets, but due to the delay, the network does not receive the status updating in time and has, in the worst case, time to transmit several data packets.

In the case described above, terminal-originated activation of the flow control is used as an example of status updating. A corresponding problem may, however, arise in any other status updating, such as in the transmission of a DTR or DCD message, or in the flow control activated by the base transceiver station. The problem is particularly difficult if the transmitted status updating concerns data carrier detect, i.e. a DCD message. Thus, too long a delay in the updating of the DCD status may result in the whole data transmission to terminate.

This problem situation can be avoided with a method according to the invention, where the status information of the L2R layer is sent every time a change in the length of the RLP frame takes place on the RLP layer as a result of a change of channel coding. Thus, the status information on the L2R layer is preferably transmitted every time the length of the RLP frame changes, irrespective of whether the status has changed or not. Thus, both the terminal and the network are always kept updated about each particular status.

Figure 4:
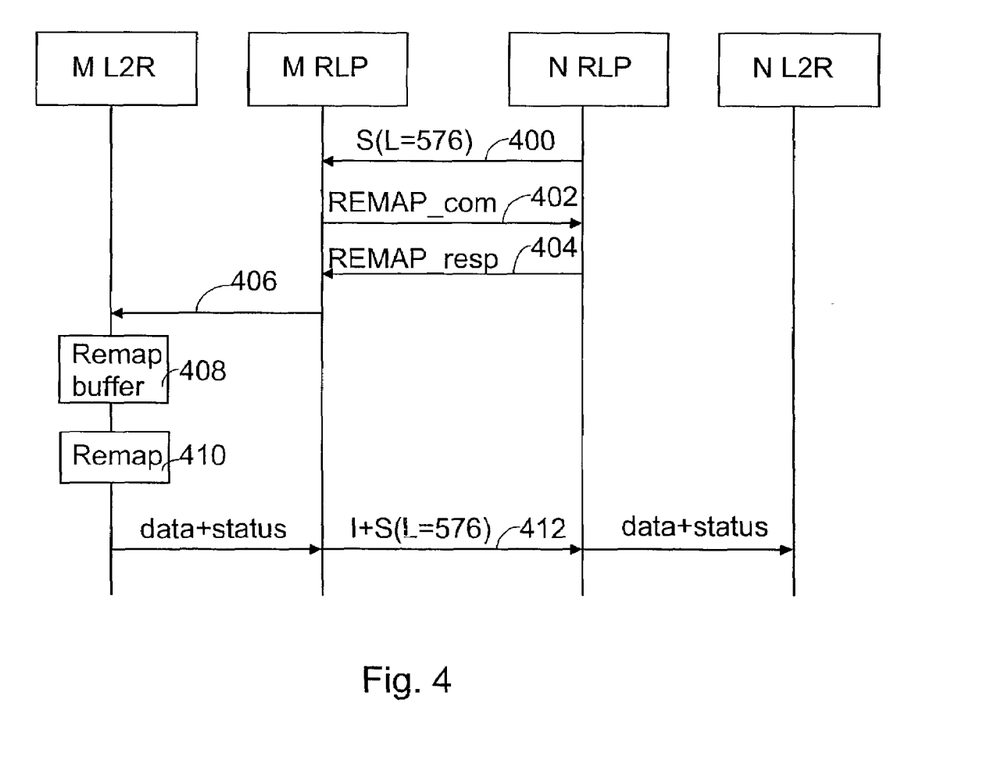
FIG. 4 shows a signalling diagram of the remap process according to an embodiment of the invention.

The method according to the invention can be illustrated by means of the signalling diagram according to FIG. 4, which shows in a simplified way the change in the length of the RLP frame on the RLP layer as a result of the change of channel coding, i.e. what is called a remap process. In the initial situation of FIG. 4, data is transferred in RLP frames of 240 bits. The change in the channel coding is initiated from the side of the network, whereby the network transmits a 576-bit frame (S frame) comprising only control information to the terminal (400). The terminal detects that the length of the frame has changed and responds to this with a REMAP_command frame (402), which comprises the sequence number expected next by the terminal. The network, in turn, responds to this with a REMAP_response frame (404), which comprises the sequence number expected next by the network. After this, both parties, the terminal and the network, begin to retransmit RLP frame data that has been transmitted after the RLP frame that the opposite side has informed as last received. The process operates in the same way in both RLP/L2R units, but in the following, this is only described from the side of the terminal.

The 240-bit RLP frames transmitted after the RLP frame informed as last received by opposite side are copied to the L2R layer (406), which unpacks the data in the frames into a special remap buffer (408). After this, always when the RLP layer is able to transmit frames, data in the buffer is arranged in the user data fields of 576-bit RLP frames (410, remap). Signalling of L2R layer can be then attached to these 576-bit RLP frames, whereby status information of the L2R layer is preferably attached to the first 576-bit RLP frame transmitted to the network (412), irrespective of when the status has last changed. Thus, the network is immediately aware of the L2R status of the terminal at that moment. In a corresponding way, the network gives the information on the L2R status of the network to the terminal. In the implementation described above, it is to be noted, however, that the data transferred in RLP frames may comprise termination of the data transmission and BREAK and BREAK_ACK messages indicating acknowledgement of the breaking, which are always to be transmitted at the same point where they were originally positioned.

Thus, the method according to the invention preferably confirms that both the terminal and the network always receive updated information on each other's L2R status, which improves the efficiency of the data transmission and the protocol structure. Further, it can preferably be confirmed that there will not be such a problematic situation that was described above, i.e. where the opposite side would have outdated L2R status information.

In accordance with a preferred embodiment of the invention, the L2R layer is arranged to interpret the first 240-bit RLP frame transferred from the RLP transmission memory to the L2R layer in such a way that the Remap process has been initiated. Correspondingly, this indicates to the L2R layer that the L2R status information must be attached to the first 576-bit RLP frame following the remap process. Thus, it is easy to confirm that every time RLP frames are gathered into the remap buffer in connection with the Remap process, the first RLP frame of a new length to be transmitted to the opposite side contains the L2R status information. It is to be noted that although in the above example the Remap process has been described as a change of the frame length from a 240-bit frame to a 576-bit one, the process according to the invention can also be implemented vice versa, i.e. from a 576-bit frame to a 240-bit one.

If the channel coding used changes again very fast, whereby a new remap process must be initiated before the whole remap buffer has been cleared in the preceding remap process, it may be problematic to store RLP frames in the remap buffer in such a way that RLP frames stored previously in the buffer are not lost.

In accordance with a preferred embodiment of the invention, this can be avoided in such a way that the RLP frames defined to be retransmitted are unpacked from the RLP transmission memory to the remap buffer, starting from the end, i.e. in the opposite order to that of the RLP transmission memory. The data in these RLP frames is thus unpacked on the L2R layer and stored in the remap buffer, starting from the last free memory locations. In this way, it can be ensured that even if the channel coding changed several times within a short period of time, data intended to be transmitted from the remap buffer will not be lost. After this, every time the RLP layer can transmit frames, the L2R layer unpacks data from the remap buffer, starting from the first stored memory location, and arranges it in the RLP frame defined by the channel coding. On the L2R layer, transmission is continued from the remap buffer as long as there is stored data to be transmitted, after which the transmission is continued from the ordinary L2R layer data buffer, which comprises user data arriving from the application layer. After this, when the RLP frames defined to be retransmitted from the RLP transmission memory have been unpacked into the L2R layer remap buffer, the RLP layer does not preferably need to know whether the data to transmitted is fed into the RLP frames from the remap buffer or from the ordinary data buffer.

With this embodiment, it can preferably be confirmed that the change in the channel coding during the data transmission can be performed irrespective of how fast the next change is performed after the preceding change of channel coding. Also means for unpacking data into the remap buffer, preferably software, can be implemented in a simpler manner.

Figure 5:
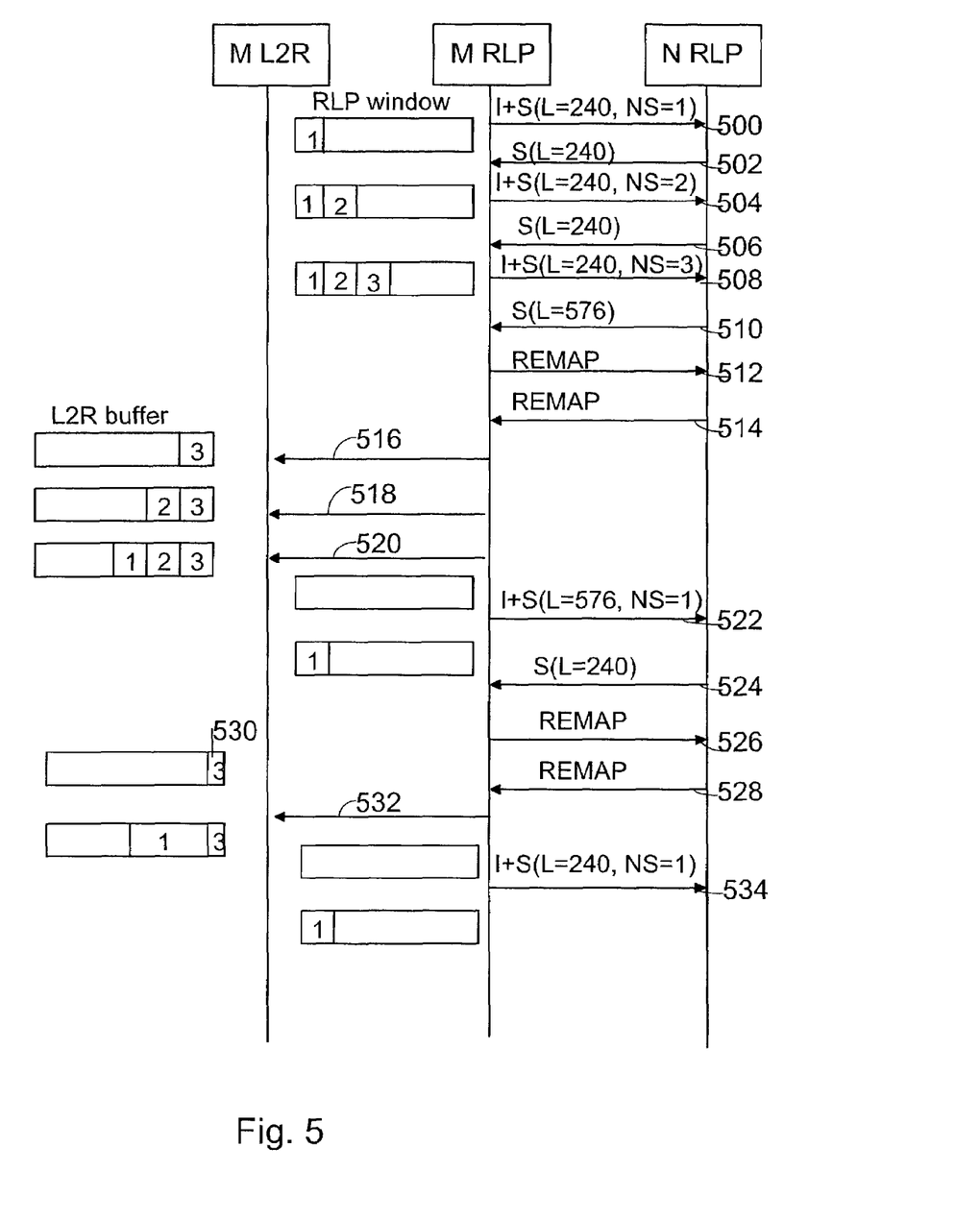
FIG. 5 shows a signalling diagram of several remap processes according to a second embodiment of the invention.

In the following, this embodiment is described in more detail with reference to FIG. 5. To illustrate the embodiment, the data transmission in the situation according to FIG. 5 takes place in the uplink direction only (i.e. from the terminal to the network). At first, the terminal transmits 240-bit RLP frames (500, 504, 508), which comprise both user data and control information (I+S frame) and the sequence numbers of which are correspondingly 1, 2 and 3. At the same time, these frames are stored in the RLP transmission memory, as shown in the figure. The terminal transmits 240-bit RLP frames (502, 506) comprising only control information (S frame) to the terminal. However, after the third transmitted RLP frame, the terminal receives the 576-bit RLP frame (510) comprising only control information (S frame), which frame thus initiates the Remap process. The terminal transmits a 576-bit REMAP_command message to the network (512), to which the network responds with a REMAP_response message (514), which comprises the definition that the terminal must retransmit the information contained in the three RLP frames transmitted previously in 576-bit RLP frames.

The RLP frame of the terminal initiates the transmission of said three RLP frames from the transmission memory to the L2R layer in such a way that at first, the RLP frame transmitted last (NS=3) is transmitted, from which frame the L2R frame decodes the data contained in it and stores the data in the last memory location (516) of the remap buffer. After this, the RLP frame transmitted second last (NS=2) is transmitted, the data of which is stored in the remap buffer in the last free memory location, in this case the second last memory location (518). Finally, the RLP frame transmitted first (NS=1) is transmitted, the data of which is again stored in the remap buffer in the last free memory location, in this case the third last memory location (520). Next, the L2R layer arranges data from the remap buffer into a 576-bit RLP frame, attaches the L2R status information to it in accordance with the above description, and transmits the RLP frame to the network (522). Next, the terminal receives a 240-bit RLP frame (524) comprising only control information (S frame) from the network, which frame then starts a new Remap process. The terminal transmits a 240-bit REMAP_command message to the network (526), to which the network responds with a REMAP_response message (528), which comprises the definition that the terminal must retransmit the information contained in the 576-bit RLP frame in 240-bit RLP frames.

There has not been sufficiently space in the 576-bit RLP frame transmitted previously for the data stored previously in the remap buffer, so that the last memory location still contains data that has not been retransmitted (530). The RLP layer of the terminal transfers said 576-bit RLP frame from the transmission memory to the L2R layer, from where the L2R layer decodes the data contained in it and stores the data in the last free memory locations of the remap buffer in such a way that the data is not stored over the buffer data stored previously (532). After this, the L2R layer starts the arrangement of data from the remap buffer into 240-bit frames, the L2R status information being attached to the first frame and transmitted to the terminal with the RLP frame (534).

It will be obvious to a person skilled in the art that with the advance of technology, the basic idea of the invention can be implemented in a plurality of ways. Thus, the invention and embodiments thereof are not confined to the above-described examples but can vary within the scope of the claims.

The invention claimed is:

1. A method comprising:
   establishing data transmission in a mobile communication system, comprising functionalities for a radio link protocol and a link protocol for realizing said data transmission, for which radio link protocol at least two different frames of fixed lengths are defined, and which link protocol is configured to transmit status information defining data transmission;
   initiating a Remap during data transmission on a radio link protocol functionality between said frames;
   indicating the initiation of said Remap to a link protocol functionality;
   transmitting radio link protocol frames being the object of the Remap from a transmission buffer of the radio link protocol functionality to the link protocol functionality in the opposite order compared with storing said frames in the transmission buffer;
   storing the data in said frames in a remap buffer of the link protocol functionality, starting from a last free memory location of the remap buffer; and
   transmitting the current status information in accordance with the link protocol in the frame of the radio link protocol transmitted first after said Remap.

2. A method according to claim 1, wherein the initiation of said Remap is indicated to the link protocol functionality by means of the first frame transmitted from said remap buffer.

3. A method according to claim 1, wherein the data in said remap buffer is arranged into radio link protocol frames used after said Remap, and
   the data transmission is continued from the transmission buffer in accordance with the link protocol functionality after the data of said remap buffer has been transmitted.

4. A mobile communication system comprising:
   a mobile station comprising functionalities for a radio link protocol and a link protocol for realizing data transmission; and
   a base transceiver station comprising functionalities for a radio link protocol and a link protocol for realizing said data transmission,
   there being at least two different frames of fixed lengths defined for the radio link protocol, and the radio link protocol being configured to transmit status information defining data transmission, wherein
   a Remap between said frames is configured to be initiated on either of said functionalities for the radio link protocol during the data transmission between the mobile station and base transceiver station;
   the initiation of said Remap is configured to be indicated to a link protocol layer functionality;
   the radio link protocol frames being the object of the Remap are configured to be transmitted from a transmission buffer of a radio link protocol functionality to the link protocol functionality of the mobile station in the opposite order compared with storing said frames in the transmission buffer;
   the data in said frames is configured to be stored in a remap buffer on the link protocol functionality, starting from a last free memory location of the remap buffer; and
   current status information in accordance with the link protocol is configured to be transmitted in the radio link protocol frame sent first after said Remap.

5. A mobile communication system according to claim 4, wherein the initiation of said Remap is configured to be indicated to the link protocol functionality by means of the frame transmitted first from said remap buffer.

6. A mobile communication system according to claim 4, wherein
   the data in said remap buffer is configured to be adapted to radio link protocol frames used after said Remap; and
   the data transmission is configured to be continued from the transmission buffer of the radio link protocol functionality after the data of the remap buffer has been transmitted.

7. An apparatus comprising:
   functionalities for a radio link protocol and a link protocol for realizing data transmission in a mobile communication system, in which radio link protocol at least two frames of fixed lengths are defined for data transmission, and which link protocol is configured to transmit status information defining data transmission, said apparatus is configured to initiate Remap during the data transmission in accordance with the radio link protocol between said frames;

the initiation of said Remap is configured to be indicated to a link protocol functionality of said apparatus;

said radio link protocol frames are configured to be transmitted from a transmission buffer of a radio link protocol functionality to the link protocol functionality in the opposite order compared with storing said frames in the transmission buffer; and data in said frames is configured to be stored in a remap buffer of the link protocol functionality, starting from a last free memory location of the remap buffer; and current status information in accordance with the link protocol is configured to be transmitted in the radio link protocol frame transmitted first from said apparatus after said Remap.

8. A method comprising:

establishing data transmission in a mobile communication system, comprising functionalities for a radio link protocol and a link protocol for realizing said data transmission, for which radio link protocol at least two different frames of fixed lengths are defined;

initiating a Remap during data transmission on a radio link protocol functionality between said frames;

transmitting the radio link protocol frames being the object of the Remap from a transmission buffer to the link protocol functionality;

unpacking the data contained in said frames into a remap buffer of the link protocol functionality; and transmitting said radio protocol layer frames from a transmission buffer of the radio link protocol functionality to the link protocol functionality in the opposite order compared with storing said frames in the transmission buffer.

9. A mobile communication system comprising:

a mobile station comprising functionalities for a radio link protocol and a link protocol for realizing data transmission; and a base transceiver station comprising functionalities for a radio link protocol and a link protocol for realizing data transmission;

there being at least two different frames of fixed lengths defined for the radio link protocol, wherein:

a Remap between said frames is configured to be initiated on either of said functionalities for the radio link protocol layer during the data transmission between the mobile station and base transceiver station;

the radio link protocol frames being the object of said Remap are configured to be transmitted from a transmission buffer of a radio link protocol functionality to the link protocol functionality of the mobile station;

the data in said frames is configured to be unpacked into a remap buffer of the link protocol functionality of the mobile station; and said radio link protocol frames are configured to be transmitted from the transmission buffer of the radio link protocol functionality to the link protocol functionality of the mobile station in the opposite order compared with storing said frames in the transmission buffer.

10. A mobile communication system according to claim 9, wherein data in said frames is configured to be stored in the remap buffer of the link protocol functionality, starting from the last free memory location of the remap buffer.

11. A mobile communication system according to claim 9, wherein the initiation of said Remap is configured to be indicated to the link protocol functionality by means of the frame transmitted first from said transmission buffer.

12. A mobile communication system according to claim 9, wherein the data in said remap buffer is configured to be adapted to radio link protocol frames used after said Remap; and the data transmission is configured to be continued from the transmission buffer of the radio link protocol functionality after the data of the remap buffer has been transmitted.

13. An apparatus comprising:

functionalities for a radio link protocol and a link protocol for realizing data transmission in a mobile communication system in which radio link protocol at least two frames of fixed lengths are defined for data transmission, said apparatus is configured to initiate a Remap during the data transmission in accordance with the radio link protocol between said frames;

the radio link protocol frames being the object of said Remap are configured to be transmitted from a transmission buffer of a radio link protocol functionality to a link protocol functionality, the data in said frames is configured to be unpacked into a remap buffer of the link protocol functionality; and said apparatus is configured to transmit said radio link protocol frames from the transmission buffer of the radio link protocol layer to the link protocol functionality in the opposite order compared with storing said frames in the transmission buffer.

14. An apparatus according to claim 13, wherein said apparatus is configured to store the data in said frames in the remap buffer of the link protocol functionality, starting from a last free memory location of the remap buffer.

15. An apparatus according to claim 13, wherein:

said apparatus is configured to adapt the data in said remap buffer to radio link protocol frames used after said Remap; and the data transmission is configured to be continued from the transmission buffer of the radio link protocol functionality after the data of the remap buffer has been transmitted.

* * * * *

UNITED STATES PATENT AND TRADEMARK OFFICE
CERTIFICATE OF CORRECTION

PATENT NO. : 7,609,715 B2  Page 1 of 1
APPLICATION NO. : 10/225434
DATED : October 27, 2009
INVENTOR(S) : Jukka Ala-Vannesluoma It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2092 days.

Signed and Sealed this

Twelfth Day of October, 2010

David J. Kappos
*Director of the United States Patent and Trademark Office*